March 13, 1934.    M. KONRAD    1,950,851
CRUSH PULVERIZER
Filed Oct. 3, 1933    2 Sheets-Sheet 1
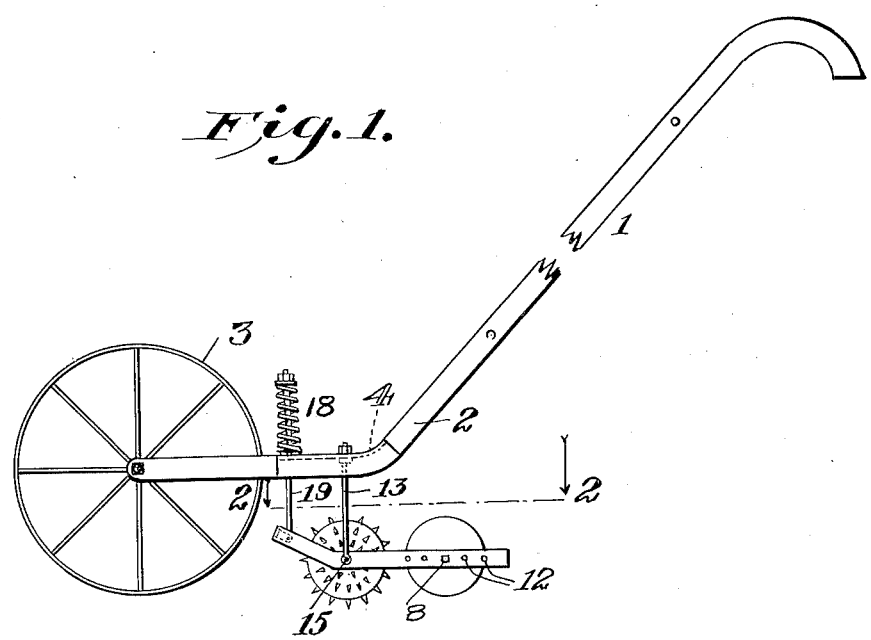
Fig. 1.
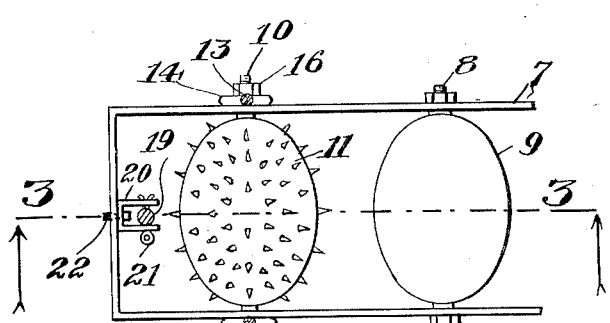
Fig. 2.
Fig. 4.
INVENTOR.
Mathias Konrad.
BY
His ATTORNEYS.

March 13, 1934.  M. KONRAD  1,950,851
CRUSH PULVERIZER
Filed Oct. 3, 1933   2 Sheets-Sheet 2

INVENTOR.
Mathias Konrad
BY
E. E. Vrooman & Co.,
His ATTORNEYS.

Patented Mar. 13, 1934

1,950,851

UNITED STATES PATENT OFFICE 1,950,851

CRUSH PULVERIZER

Mathias Konrad, Eureka, Calif.

Application October 3, 1933, Serial No. 691,994

2 Claims. (Cl. 97—59)

This invention relates to a crush pulverizer.

An object of the invention is the provision of simple and efficient means for crushing the caked soil over planted seed and pulverizing the soil to facilitate the young plants in coming forth out of the ground.

Another object of the invention is the novel construction of the primary frame of a wheeled hoe or cultivator so as to receive a novel roller carrying primary frame, together with an equalizing device, whereby a very efficient apparatus for treatment of the earth or soil that has been seeded is provided.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 1 is a view in side elevation of an apparatus constructed in accordance with the present invention.

Figure 2 is a top plan view taken on line 2—2, Figure 1, and looking in the direction of the arrow.

Figure 4 is a top plan view, similar to Figure 2 of another embodiment of the invention.

Figure 3:
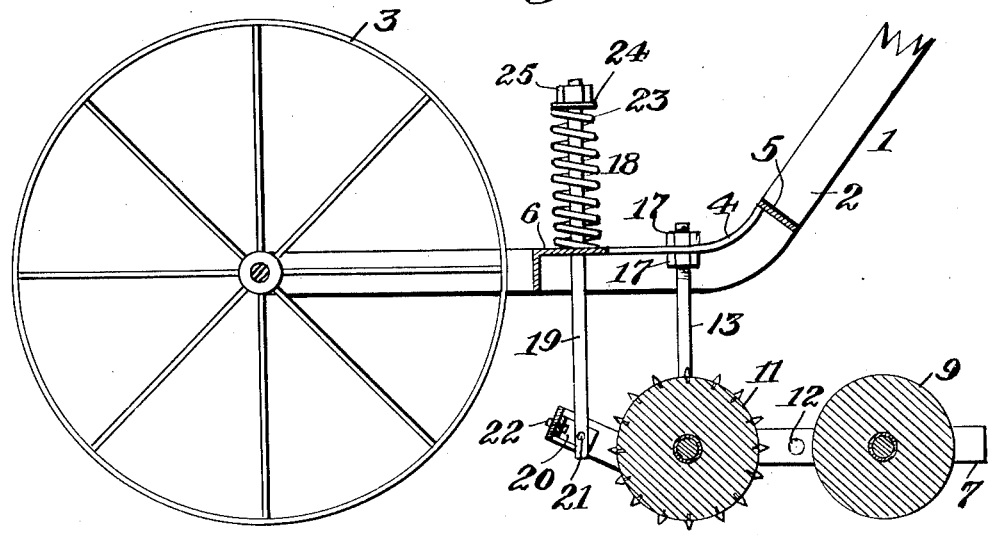
Figure 3 is an enlarged longitudinal, vertical sectional view of the apparatus, taken on line 3—3, Fig. 2 and looking in the direction of the arrows.

Referring to the drawings by numerals, 1 designates the primary frame of a wheeled hoe or cultivator. This frame 1 comprises two sides 2, each of which is provided near wheel 3 with an inwardly extending flange 4 (Fig. 3), for the purpose hereinafter specified. A transverse bracing bar 5 is at the outer ends of flanges 4 and connects the sides 2. An L-shape bar 6 is at the inner ends of flanges 4 and also connects and strengthens the sides 2 of frame 1.

A substantially U-shape auxiliary frame 7 is provided which is bent up at its inner end to facilitate in clearing the cultivated land. An axle bolt 8 extends across the frame 7 and carries the smooth rear roller 9. An axle bolt 10 extends across frame 7 near its inner end and this bolt carries the front roughened or spiked roller 11. The auxiliary frame 7 is provided with a plurality of registering apertures 12 (Figs. 1 and 5) for permitting adjustment of the rear roller 9 longitudinally of the frame, as the operator desires. For attaching the auxiliary frame 7 to the primary frame 1, I preferably employ two vertical eye-bolts 13. The axle bolt 10 (Fig. 2) extends through the eyes 14 on the lower ends of eye-bolts 13, with the head 15 and the nut 16 of said bolt holding the eye-bolts in position. The upper ends of the bolts 13 extend through the horizontal inwardly extending flanges 4 (Fig. 3), with nuts 17 on each bolt, engaging the top and bottom faces of a flange, for securely fastening the bolts in position on the primary frame.

An equalizing device 18 is provided, comprising vertical rod 19, which rod extends at its lower end into a small U-shape bracket 20. A cotter pin 21 extends through U-shape bracket 20 and the rod 19, securely fastening the same together. A bolt 22 secures bracket 20 to the inner upwardly extending end of auxiliary frame 7. The rod 19 extends through the horizontal portion of the L-shape bar 6. A coil spring 23 is around rod 19 with its lower end engaging the top of the horizontal portion of L-shape bar 6, and the upper end of spring 23 engages a washer 24. The washer 24 engages nut 25 on the upper or outer end of rod 19. By screwing inwardly on nut 25, the tension on spring 23 can be increased to tilt up the inner end of the auxiliary frame 7, whereby the smooth roller 9 presses more firmly on the ground. By loosening nut 25, the equalizing device 18 will remove some of the pressure off the ground by slightly raising the rear roller. Therefore, it will be seen that I have provided an efficient equalizing device for obtaining the exact pressure and results that the operator desires for the apparatus in treating the crushed and pulverized dirt over planted seed.

Figure 5:
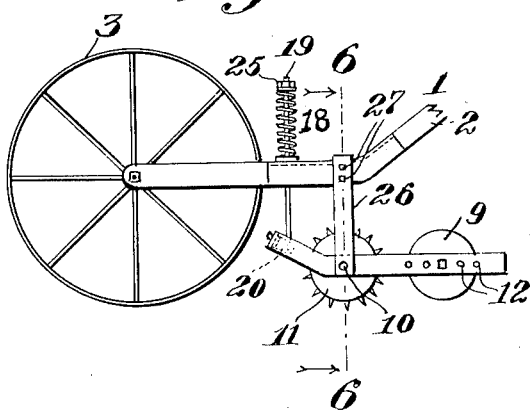
Figure 5 is a view in side elevation of the device shown in Figure 4, attached to the primary frame of the apparatus.
Figure 6:
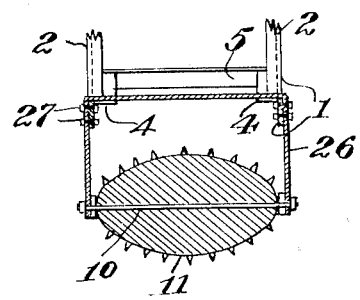
Figure 6 is a transverse sectional view taken on line 6—6, Fig. 5, and looking in the directions of the arrows.

In the embodiment shown in Figures 4 to 6, the same structure as hereinbefore described is employed, except I substitute an inverted U-shape bracket 26 in place of the two eye-bolts 13. This bracket 26 is laid over the frame 1 and by suitable bolts or rivets 27, the bracket is fixedly secured to the frame. The lower ends of the bracket 26 carry the axle bolt 10, on which is the spiked roller 11.

In Figure 4, I have not shown the U-shape bracket 20, but in this embodiment, said bracket is placed and attached in the same manner as hereinbefore described for the arrangement in the preferred embodiment, Figs. 2 and 3.

This apparatus is easily operated by a single person, and is admirably useful for the cultivation of seeded land, especially for the home gardener.

While I have described the preferred embodiments of my invention and illustrated the same in the accompanying drawings, certain minor changes or alterations may appear to one skilled in the art to which this invention relates, during the extensive manufacture of the same, and I, therefore, reserve the right to make such changes or alterations as shall fairly fall within the scope of the appended claims.

What I claim is:

1. In an apparatus of the class described, the combination of a frame provided with sides, an L-shape bar connecting said sides, an auxiliary U-shape roller carrying frame under said primary frame, said auxiliary frame bent upwardly at its inner end, means intermediate the ends of said auxiliary frame and connecting the same to said primary frame, a small U-shape bracket within said auxiliary frame and against its inner upwardly extending end, said small U-shape bracket being under said L-shape bar, a bolt extending through said small U-shape bracket and through said auxiliary frame fastening the same together, a vertical rod extending through said L-shape bar and having its lower end positioned within said small U-shape bracket, a cotter pin extending through said small U-shape bracket and through said rod, a coil spring around said rod and having its lower end bearing upon said L-shape bar, and a nut and a washer on said rod against the upper end of said coil spring.

2. In an apparatus of the class described, the combination of a primary frame including two parallel sides, each of said sides provided with an inwardly extending horizontal flange, a reinforcing bar against the outer end of said flanges and connecting the sides of said primary frame, an L-shape bar at the inner ends of said flanges and connecting the sides of said frame, an auxiliary frame provided with a roller under said primary frame, said roller having an axle bolt extending therethrough and through the sides of said auxiliary frame, eye-bolts with said axle bolt extending through their eyes, said eye-bolts extending at their upper ends through said inwardly extending horizontal flanges, a pair of nuts against the upper and under face of each flange and on each eye-bolt, a rod connected at its lower end to the inner end of said auxiliary frame, said rod extending through the horizontal portion of said L-shape bar, and means fastening said rod on said L-shape bar.

MATHIAS KONRAD.